April 16, 1935.    H. SUNDHAUSSEN    1,998,209
WARD-LEONARD CONTROL SYSTEM
Filed Aug. 8, 1933    3 Sheets-Sheet 1
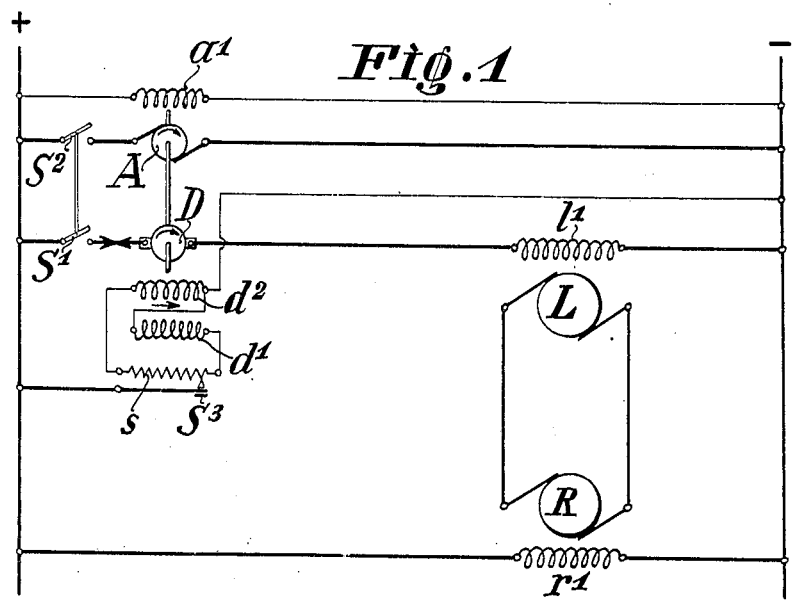
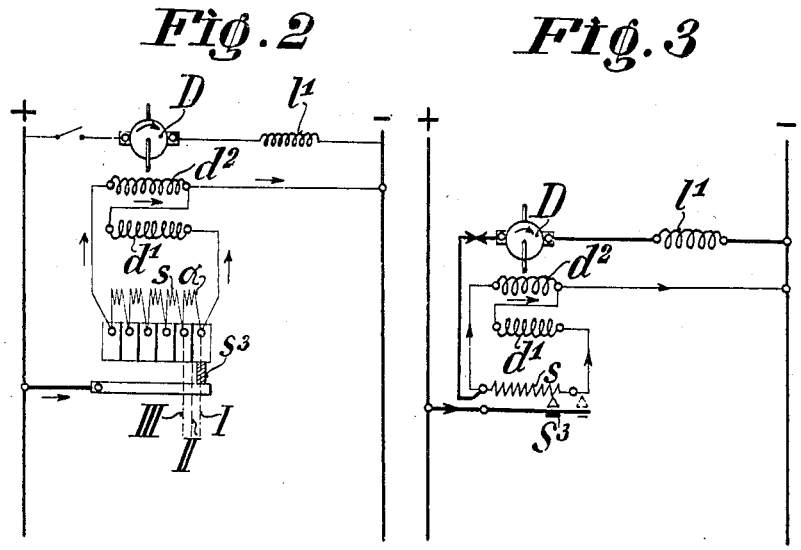
Inventor:
Hermann Sundhaussen

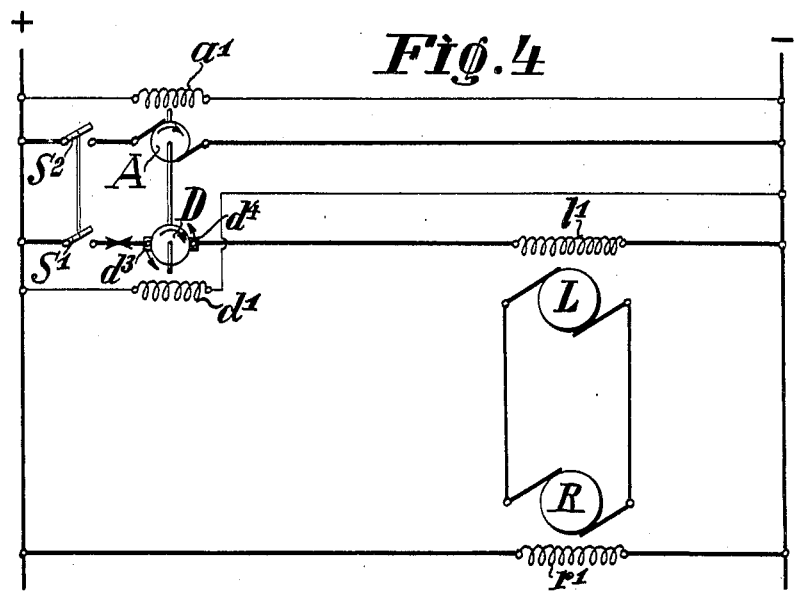
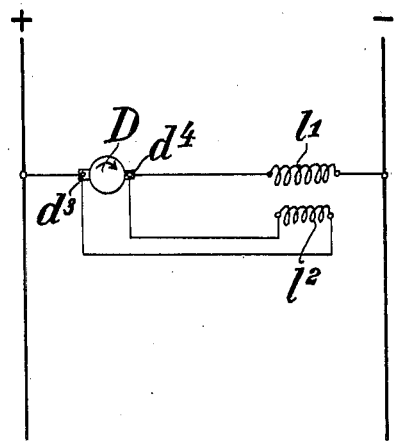

April 16, 1935.  H. SUNDHAUSSEN  1,998,209
WARD-LEONARD CONTROL SYSTEM
Filed Aug. 8, 1933  3 Sheets-Sheet 3
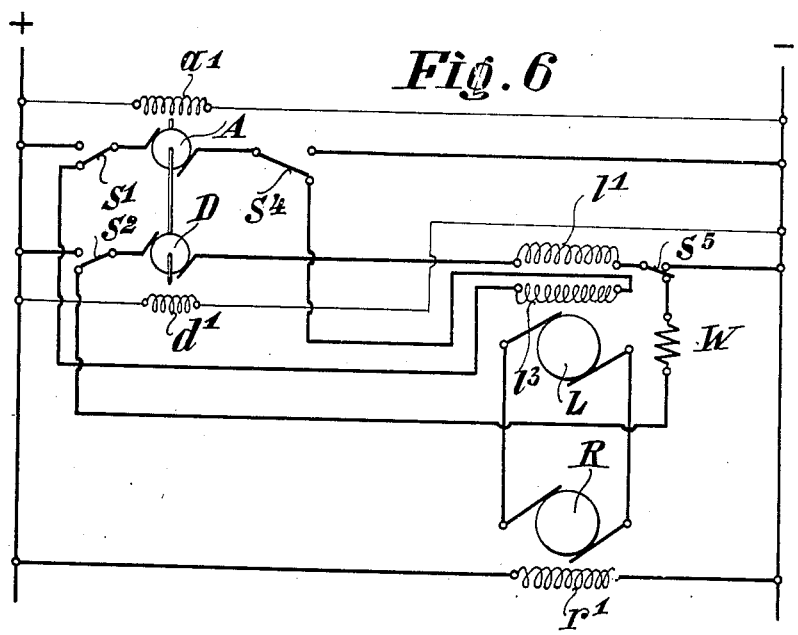
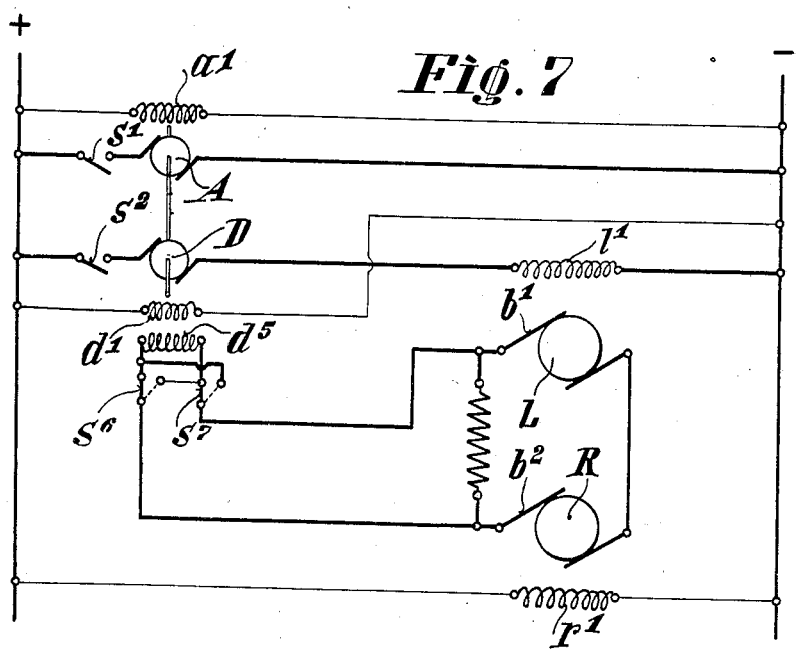
Inventor:
Hermann Sundhaussen
By
Attorney.

Patented Apr. 16, 1935

1,998,209

UNITED STATES PATENT OFFICE 1,998,209

WARD-LEONARD CONTROL SYSTEM

Hermann Sundhaussen, Dusseldorf-Rath, Germany, assignor to Rheinische Metallwaaren- und Maschinenfabrik, Dusseldorf-Derendorf, Germany, a corporation of Germany Application August 8, 1933, Serial No. 684,251
In Germany July 18, 1928

11 Claims. (Cl. 172—239)

The invention relates to a Ward-Leonard control system in which the excitation of the control generator and, therefore, the speed of rotation of the prime mover is controlled by means of a counter-voltage machine. The exciter winding of the control generator of such a Ward-Leonard system is placed in series with the armature of the counter-voltage machine across a source of constant voltage, for instance across the supply system. By the control of the counter voltage, the exciting voltage of the Ward-Leonard generator, which is equal to the line voltage reduced by the counter voltage, is controlled. The counter voltage machine which is constructed as a shunt wound machine in the known system of this kind, is loaded by a brake or by driving a machine as a pump, a fan, a generator or the like. In contrast thereto, in the system according to the invention, the counter voltage machine is additionally driven by a shunt machine switched in simultaneously with the excitation of the Ward-Leonard generator.

The advantage peculiar to the known systems controlled by loaded counter-voltage machines, that they start surely under load even at the regulated minimum speed, is also obtained with the system according to the invention. The system according to the invention with a driven counter voltage machine, as compared with the Ward-Leonard system with loaded counter voltage machine, has moreover the additional advantage that the range of regulation is considerably greater.

The drawings show several forms of construction according to the invention.

Fig. 1 is the wiring diagram of a Ward-Leonard system according to the invention, in which the counter voltage is regulated by varying the excitation of the counter voltage machine.

Fig. 2 shows in a circuit as in Fig. 1 a modified arrangement of the exciter field coil of the counter voltage machine and the appropriate regulating resistances and their contact bank.

Fig. 3 is a further modified form of construction of the system shown in Fig. 1.

Fig. 4 is a system in which according to the invention the counter voltage is controlled by the displacement of the brushes of the counter voltage machine.

Fig. 5 shows a counter exciting winding connected to the brushes of the counter voltage machine and arranged in the field of the Ward-Leonard generator.

Fig. 6 shows an additional circuit arranged for the neutralization of remanent magnetism in the generator field.

Fig. 7 shows an additional circuit for neutralizing the influence of fluctuation of load on the prime mover.

In the following description the counter voltage machine is referred to briefly as a damping machine.

The armature R of the Ward-Leonard motor is, as shown in Fig. 1, connected in series according to the Ward-Leonard principle with the armature L of the Ward-Leonard generator. The exciter coil $r^1$ of the motor is connected permanently across the line voltage. The Leonard generator is excited by the coil $l^1$. In series with the exciting coil $l^1$ of the Ward-Leonard generator is arranged the armature D of the damping or counter E. M. F. machine, the field of which is excited by the coils $d^1$ and $d^2$ which are permanently in circuit. The armature D is driven by a shunt machine having an armature A and an exciter coil $a^1$ which is connected permanently across the supply. The two coupled switches $s^1$ and $s^2$ close the circuits of the armatures D and A at the same time as the field winding $l^1$ of the Ward-Leonard generator.

When the Ward-Leonard system is switched on the damping unit is at first at rest. Thus at first the damping armature D produces no counter-voltage. Therefore, when adjusted for the lowest degree of speed, at first almost the full voltage of the system is applied to the exciter coil of the Ward-Leonard generator, so that a powerful rapid excitation of the generator and a powerful starting torque of the Ward-Leonard motor is ensured. Not until the damping machine with the shunt machine driving it, has reached its full speed, does the low excitation, necessary for the lowest degree of speed occur.

When the regulating contact $S^3$ is in the position shown in Figs. 1 and 2, almost the entire control resistance $s$ is in series with the exciter winding $d^2$ of the armature D; almost no resistance is in series with the winding $d^1$. At the regulating contact $S^3$, therefore, a branching of the current will take place in such a manner that the current flows almost entirely by way of the coil $d^1$. Only a very slight current flows through the coil $d^2$. The field of the coil $d^1$, therefore, far outweighs the opposing field of the coil $d^2$.

In this position of the contact $S^3$ the maximum excitation occurs in the machine D. When the excitation of the coil $d^1$ overcomes that of the coil $d^2$ the voltage produced in the machine D is directed oppositely to the supply voltage.

If the regulating contact is thrust gradually to the left, the resistance $s$ is gradually removed from the circuit of the coil $d^2$ and brought into series with the coil $d^1$.

As soon as the regulating contact $S^3$ has reached the middle of the control resistance $s$, an equal resistance is in series with the two coils $d^1$ and $d^2$. The excitation of the coils $d^1$ and $d^2$ is, therefore, equal and the resultant excitation is nil. Thus the field of the damping machine, apart from the residual field, is not excited. In this case the armature D acts merely as an ohmic resistance. If the regulating contact $S^3$ is thrust beyond the middle of the control resistance $s$ further towards the left, the excitation of the coil $d^2$ outweighs that of coil $d^1$ and the resultant excitation of the two coils gradually increases again in opposite direction until the maximum value is reached. Thereby the voltage generated in the armature D also reverses its direction, and like the excitation gradually increases to its maximum value. The damping machine D then operates as a generator driven by the shunt motor A. The similarly directed voltage of the damping machine is then added to the line voltage. The voltage across the exciter coil $l^1$ of the Ward-Leonard generator L thus becomes equal to the line voltage plus the voltage of the damping machine.

Consequently, as compared with the Ward-Leonard systems with loaded damping machines in which the damping tension always opposes the line voltage, the range of control attainable by the damping machine is doubled, which is an advantage which should not be under-estimated. This advantage can be gained only by the damping machine being driven by a shunt machine placed immediately in the circuit. When the known loaded damping machines are used it is impossible to drive the damping machines as a generator by means of the machines which load the armature.

The known loaded damping machines constantly take the rather great output necessary for driving the prime mover; therefore when the starting is finished, they still allow a very powerful current to pass through. These loaded damping machines cannot be used for a Ward-Leonard unit, in which the lowest speed limit of the Ward-Leonard motor must be reduced as low as possible, because for a very low speed of the Ward-Leonard motor a very slight excitation of the Ward-Leonard generator is required. The strength of the exciter current necessary for the lowest speed of the Ward-Leonard motor on the Ward-Leonard generator, is so slight that the current allowed to pass from a loaded damping machine, even from an idle-running damping machine, would still yield a much too strong exciter current. For this reason, according to the invention, the damping machine is additionally driven and kept at a speed which is above its idle-running speed, that is to say the driving speed is so selected that the maximum counter voltage produced by the armature D is slightly less than the line voltage.

The voltage acting on the exciter coil of the Ward-Leonard generator (at the lower speeds the line voltage being reduced by the counter voltage of the armature D), is, therefore, extremely low at the lowest speed limits, so that the exciter current is also very slight, such as is necessary for obtaining a very low speed of the Ward-Leonard motor.

According to the above, the driven damping machine offers the advantage that it extends the range of control both downwards and upwards.

If the damping machine D had to serve only for the adjustment of the different degrees of speed, it might be driven by any suitable prime mover as however, the damping machine also shall be used for regulating the rapid excitation of the Ward-Leonard generator, it must be driven by an electric machine which is switched on exactly at the same time as the excitation $l^1$ of the Ward-Leonard generator L, and whose starting properties are suitably selected.

In Fig. 2 the contact bank of the control resistance $s$ of the regulating contact $S^3$ is constructed in such a manner that when it passes from one bar (for instance position I) to the other (position III) in a middle position (position II) it comes into contact with both bars. Thus when the contact $S^3$ is moved from one bar to the other, the step $\alpha$ of the control resistance $s$ is at first only removed from the circuit of the exciter coil $d^2$ and short-circuited. In the circuit of the coil $d^1$ there is still no resistance. Not until the contact $S^3$ arrives in the position III is the resistance step $\alpha$ switched into the circuit of the coil $d^1$. Thus, on each displacement of the contact $S^3$ from one bar to the other, there occurs a two-stage change of the resultant excitation of the two coils $d^1$, $d^2$. Thus there are twice as many regulating steps as bars and resistance steps.

In Fig. 3 the control resistance $s$ of the coils $d^1$, $d^2$ are at the same time in the circuit of the damping armature D and of the exciting coil $l^1$ of the Ward-Leonard generator L. When regulated for the lowest degree of speed, the regulating contact $S^3$ is in the position shown in Fig. 3. The entire resistance then is in series with the damping armature and the exciting coil $l^1$ of the Leonard generator. When higher degrees of speed are switched in, the regulating contact $S^3$ is thrust to the left, whereby the resistance $s$ is gradually removed from the exciter circuit of the Ward-Leonard generator. This arrangement offers the advantage that at low speeds, the exciter current of the Leonard generator is already strongly reduced by the resistance $s$. It is, therefore, not necessary to bring the counter voltage too near to the line voltage, so that when fluctuations of the line voltage occur, the exciter voltage does not change its direction so readily and an unintentional change of direction of rotation of the prime mover is prevented.

The arrows directed towards one another in Figs. 1, 3 and 4 in the circuit of the damping armature D are intended to indicate that in this circuit the line voltage and the voltage of the damping armature are in opposition.

In the typical embodiments of the invention hitherto described the counter voltage of the damping machine D is regulated by a stepped (graduated) control-resistance $s$ being in series with the exciting coil $d^1$, $d^2$. Consequently, only a gradual regulation of the speed of the Ward-Leonard motor is possible.

In the example of construction according to Fig. 4, in contrast to the above, the voltage of the damping machine is regulated without steps by displacement of the brushes $d^3$, $d^4$ of the armature D. In Fig. 4, therefore, no regulation of a differential field in the damping machine is necessary, but an ordinary exciter coil $d^1$ is provided. Control resistances are entirely dispensed with.

The switches $S^1$, $S^2$ and the device for displacing the brushes $d^3$, $d^4$ are preferably brought into such mutual dependence that when the switches $S^1$, $S^2$ are switched on the brushes are first of all adjusted for minimum speed.

When the brushes $d^3$, $d^4$ are in the position shown in Fig. 4 which corresponds to the lowest value of speed, the full voltage of the damping machine, which is only a little lower than the line voltage, is opposed to the line voltage. The voltage acting on the exciter coil $l^1$ of the Ward-Leonard generator, and which is the difference between the line voltage and the full damping voltage, is accordingly low, likewise the excitation of the Ward-Leonard generator and the speed of the motor R.

Now if the brushes $d^3$, $d^4$ are displaced as indicated by the arrows on the brushes in the drawings, the voltage produced by the damping machine falls. Thus the difference between the line voltage and the damping voltage and also the excitation of the Ward-Leonard generator and the speed of the Ward-Leonard motor increases. If the brushes $d^3$, $d^4$ of the damping machine D are displaced by 90°, the voltage of the damping machine—apart from the remanent field—is nil. Then approximately the full line voltage acts on the exciter coil $l^1$ of the Leonard generator.

On further displacement of the brushes $d^3$, $d^4$ beyond 90°, the damping voltage changes its direction and again rises, until—after the brushes have been displaced approximately 180°—it again reaches its maximum value.

On reversal of the damping voltage the latter is in the same sense as the line voltage. Thus the damping voltage is added to the line voltage. The voltage on the exciter coil $l^1$ of the Ward-Leonard generator is, therefore, like the line voltage increased by the damping voltage.

The voltage on the exciter coil $l^1$ of the Ward-Leonard generator can thus be regulated without steps between the limits "line voltage minus the damping voltage" and "line voltage plus the damping voltage". Control resistances are completely dispensed with.

In Fig. 5, to the brushes $d^3$, $d^4$ of the armature D there is connected an additional exciter coil $l^2$ arranged on the field magnets of the Ward-Leonard generator.

This additional excitation acts against the excitation of the Ward-Leonard generator as long as the machine D delivers a voltage opposed to the line voltage, whereas after reversal of the voltage of the machine D it increases the excitation of the Ward-Leonard generator. This additional arrangement, like the previously described arrangement according to Fig. 3, has the advantage that in adjusting for the minimum speed it is not necessary to bring the counter-voltage so close to the line voltage. Thus in the event of fluctuations in line voltage, the avoidance of an unintentional reversal of the exciter voltage of the Ward-Leonard generator and, therefore, the avoidance of an unintentional reversal of the direction of rotation of the prime mover is ensured.

Fig. 6 shows a device for neutralizing the remanent magnetism in the field magnets of the Ward-Leonard generator.

When the motor A is switched off, its armature is placed across a coil $l^3$ arranged on the magnets of the Ward-Leonard generator by the switches $S_1$, $S_4$. The decelerating armature A, therefore, gives a short rush of current through the coil $l^3$ which acts to neutralize the remanent magnetism. The armature circuit of the damping machine D is simultaneously closed by the switch $S_5$ by way of the exciter coil $l^1$ and a resistance W.

The switching off always occurs with the minimum degree of speed, so that at the moment of switching off the voltage of the damping machine opposes the line voltage. When the line voltage is switched off, the exciter current in the coil $l^1$ is, therefore, reversed until the machines A and D have come to a standstill. This short rush of current likewise acts to neutralize the remanent magnetism.

In order that fluctuations of load on the motor R may be prevented from influencing the speed of the drive, according to Fig. 7 on the magnets of the damping machine D, there is fitted an additional coil $d^5$ which is connected with a brush $b^1$ of the Ward-Leonard generator L, and with the brushes $b^2$ of the motor R connected therewith. In the position of the switches $S^6$ and $S^7$ shown in Fig. 7, the coil $d^5$ acts against the excitation of the coil $d^1$. When the voltage of the machine D with the line voltage is reversed and caused to proceed in the same direction, the switches $S^6$ and $S^7$ are moved into the position indicated by broken lines, so that now the additional coil $d^5$ increases the excitation of the damping machine. When the load on the motor R is increased, the voltage drop between the brushes $b^1$ and $b^2$ and, therefore, also the excitation of the coil $d^5$ increases. By this means, as long as the voltage of the machine D opposes the line voltage and the switches $S^6$ and $S^7$ assume the position shown in the drawings, the counter voltage is decreased, that is to say the exciting voltage on the coil $l^1$ is increased. But as soon as the voltage of the machine is reversed, that is to say proceeds in the same direction as the line voltage, and the switches $S^6$ and $S^7$ are in the position indicated by broken lines, the increasing excitation of the coil $d^5$ increases the excitation of the machine D. Thus the exciting voltage on the coil $l^1$ of the Ward-Leonard generator again increases with increasing load of the motor R. Thus a drop in speed is counteracted.

The systems shown in Figs. 6 and 7 may be equipped with one of the regulating devices according to Figs. 1 to 5. In the system of Figs. 6 and 7 the voltage of the machine D is regulated by brush displacement.

I claim:

1. In a control system of the Ward-Leonard type which contains a Leonard generator, a Leonard motor, a counter voltage machine in series with the exciter coil of the Leonard generator across a source of constant voltage, a shunt motor to drive said counter voltage machine at constant speed, and means to manually control the voltage of said counter voltage machine; the arrangement of control means to set the counter voltage machine to generate a voltage against that of the source, said means comprising two oppositely acting field coils in said machine and a resistor, arranged with two ends of the coils connected together and with one side of the source and the other ends connected together through the resistor, to which the other side of the source is adjustably connected in combination with other control means for switching in the shunt motor driving the counter voltage machine simultaneously with the exciter coil of the Leonard generator.

2. A Ward-Leonard system according to claim 1, in which said resistance comprises a brush co-operating with a contact bank acting as a voltage and current divider and is so designed that the brush when simultaneously contacting with two contacts of said bank and short-circuiting the resistance step between them, provides an additional regulating step for said oppositely acting field coils.

3. A Ward-Leonard system according to claim 1, in which the control resistance is also connected in series with the armature of the counter voltage machine across the source, and is reduced with the adjustment for higher speeds.

4. A Ward-Leonard system according to claim 1, in which said resistance comprises a brush co-operating with a contact bank acting as a voltage and current divider and is so designed that the brush when simultaneously contacting with two contacts of said bank and short-circuiting the resistance step between them, provides an additional regulating step for said oppositely acting field coils, and in which the control resistance is also in series with the armature of the counter voltage machine across the source, and is reduced with the adjustment for higher speeds.

5. A Ward-Leonard system according to claim 1, in which on the field magnets of the Leonard generator there is provided, for neutralizing the remaining field, a cross field coil which when the excitation of the Leonard generator is switched off, is switched in circuit with the armature of the shunt machine driving the counter voltage machine.

6. A Ward-Leonard system according to claim 1, in which across the brushes of the counter voltage machine there is provided a secondary exciting coil arranged on the magnets of the Leonard generator, and which, at the adjusted lower speed, opposes the main excitation coil.

7. A Ward-Leonard system according to claim 1, in which the armature of the shunt motor of the counter voltage machine, when the driving unit is switched off, is connected in series with a coil arranged on the magnets of the Leonard generator, said coil opposing the main exciter winding, so that the energy of the armature which is slowing down is used for neutralizing the remaining field in the magnets of the Leonard generator.

8. A Ward-Leonard system according to claim 1, in which the armature circuit of the counter voltage machine, when the driving unit is switched off, is closed through a resistance and an exciting coil of the Leonard generator.

9. A Ward-Leonard system according to claim 1, in which on the magnets of the counter voltage machine there is arranged a coil connected to a brush of the Leonard generator and to a brush of the Leonard motor connected therewith.

10. In a control system of the Ward-Leonard type, a Leonard generator, a counter voltage machine in series with the field of said generator across a constant voltage slightly higher than the maximum voltage of said machine, a shunt motor driving the counter voltage machine at constant speed, means for manually switching in the said shunt motor simultaneously with said field, and manually operated control means for causing the counter voltage machine to first generate its maximum voltage in opposition to said constant voltage and then to vary its voltage gradually and by fine steps through zero to maximum reverse voltage whereby the voltage across the generator field gradually increases from about zero to about double the said constant voltge.

11. A system according to claim 10, in which the commutator brushes of the counter voltage machine are adjustable through a maximum range of 180 electrical degrees.

HERMANN SUNDHAUSSEN.